United States Patent [19]
Muller et al.

[11] Patent Number: 6,039,367
[45] Date of Patent: Mar. 21, 2000

[54] OVERPAINTABLE BUMPER WITH ULTRASOUND TRANSDUCER

[75] Inventors: Harry Muller, Steinheim; Joachim Mathes, Heilbronn, both of Germany

[73] Assignee: ITT Manufacturing Enterprises, Inc., Wilmington, Del.

[21] Appl. No.: 09/117,049

[22] PCT Filed: Jan. 11, 1997

[86] PCT No.: PCT/EP97/00110

§ 371 Date: Nov. 25, 1998

§ 102(e) Date: Nov. 25, 1998

[87] PCT Pub. No.: WO97/26155

PCT Pub. Date: Jul. 24, 1997

[30] Foreign Application Priority Data

Jan. 20, 1996 [DE] Germany .......................... 196 01 987

[51] Int. Cl.[7] ............................. B60R 19/48; G01S 15/93
[52] U.S. Cl. ......................................... 293/117; 293/102
[58] Field of Search ................................... 293/117, 102; 180/271, 274

[56] References Cited

U.S. PATENT DOCUMENTS 4,636,997  1/1987  Toyama et al. ........................ 367/140
5,951,194  9/1999  Faass et al. ........................... 403/256

FOREIGN PATENT DOCUMENTS

| 39 42 248 | 5/1990 | Germany. |
| 43 33 066 | 3/1995 | Germany. |
| 44 10 895 | 5/1995 | Germany. |
| 2 287 917 | 4/1995 | United Kingdom. |

OTHER PUBLICATIONS

Search Report of the German Patent Office Relating to Parent German Patent Application 196 01 987.7.

German Publication Application No. 34 23 601.

*Primary Examiner*—Joseph D. Pape
*Assistant Examiner*—Patricia Engle
*Attorney, Agent, or Firm*—J. Gordon Lewis

[57] ABSTRACT

The invention relates to a bumper that features holders suitable for the acceptance of ultrasound transducers. The objective of the invention is to improve the coating properties of such a holder by avoiding mold seams. The invention essentially consists in providing the holder with an integrally cast panel which covers mold seams on the transducer and/or divides the holder into two holder segments, with the first holder segment being integrally cast onto the bumper.

10 Claims, 2 Drawing Sheets

OVERPAINTABLE BUMPER WITH ULTRASOUND TRANSDUCER

TECHNICAL FIELD

The invention relates to a preferably overpaintable bumper with a holder for acceptance of a an ultrasound transducer.

BACKGROUND OF THE INVENTION

Ultrasound transducers are increasingly being inserted into the bumper of a motor vehicle for use with distance warning equipment, parking aids, and similar equipment. To this end, a series-manufactured bumper must be prepared for acceptance of the ultrasound transducer. This is achieved by drilling an opening and inserting a holder which, in turn, accepts the ultrasound transducer. The holder is frequently welded permanently to the bumper. Exchangeable holding devices have also been proposed, as described in the applicant's patent application 195 28 474.7, through which transducers of various dimensions can be fitted to the uniform acceptance opening of a bumper.

There is a growing trend toward painting the bumpers on motor vehicles. The disadvantage of known bumpers that are equipped with a holder for acceptance of an ultrasound transducer is that they feature relatively narrow mold seams, which result in a poor appearance after overcoating. In addition, paint tends to creep along the adjacent interfaces of the mold seams and then harden.

Consequently, the objective of the invention is to specify novel designs of bumper holders that are particularly advantageous in terms of painting of the bumper.

Thus, an initial solution of the objective consists, in principle, in immediately connecting a first holder to the bumper in one piece and then later connecting a second holder segment permanently to the first holder segment. The advantage here consists in the fact that it is possible, to mold the first holder segment directly to the bumper during its manufacture, with the first holder segment being installed in a relatively simple manner. Consequently, the casting molds are not required to meet any special specifications, as the connecting elements between the holder and the transducer casing, which are known, for example, from 195 28 474.7, are not integrally cast directly to the bumper. In this respect, no special advance performance is provided for the event that the bumper is to be delivered without ultrasound transducers, and the addition of the first holder segment only adds a slight complication to the shape of the bumper. The opening in the bumper needed for acceptance of the transducer casing can either be incorporated immediately during the bumper casting process or this opening can be cut out later for installation of the transducer. The primary advantage of this invention solution consists in the fact that a visible mold seam, which would otherwise be created when the entire holder is subsequently welded into the bumper, is avoided on the visible surface of the bumper between the bumper and the holder.

An additional advantage consists in the fact that the second holder segment, which is later joined to the first segment, can assume a certain adapter function in that it can be used, for example, to match the external dimensions of various transducers to the internal dimensions of the first holder segment. All that is required to achieve this is to pull an annular protrusion of the second holder segment forward to the visible end of the transducer casing on the bumper, with the inner diameter of the second casing segment matching the outer diameter of the corresponding transducer casing.

Measures are disclosed for purposes of permanently connecting the two holder segments to one another.

To enlarge the connection surface between the two holder segments, it is advantageous to apply projection or recess features on the bumper. The two corresponding connection elements (projection and recess) provide both for centering and for enlargement of the connection surface. However, as described above, the use of corresponding steps in the two holder segments can also result in an advantageous solution which, at the same time, can exercise a certain adapter function.

An especially simple design of a bumper equipped with a holder results when the projection adjoins a simple clearance hole through the bumper. The transducer casing is secured by a catch inside the complicatedly designed second holder segment, which is later joined to the first holder segment.

A second solution of the problem is provided in a bumper according to the invention by equipping the clearance hole for the holder with an inwardly projecting console that serves as a panel to cover the perimeter of the transducer. As both the cross-sectional area of the transducer casing and the seal connecting the inner surface of the casing with the outer surface of the resonator lie within the radially outer perimeter of the transducer, the console-like projection can be used to cover both the cross-sectional area of the casing and an annular partial surface of the seal, so that two mold seams are covered by the projection. At the same time, it is also possible to simplify the shape of the casing, as it would otherwise also have to include an internally oriented projection to secure the seal against the casing. For purposes of improving the radiating effect of the resonator and improving its appearance, the face of the resonator concludes with the front face of the bumper. The resonator is pulled forward in relation to the seal to align the front edge of the resonator with the leading edge of the projection, so that they are at the same level. In this case, it is important to ensure that a sufficient space exists between the casing surface of the resonator and the inner surface of the projection, so as to prevent the two parts from being glued together by a penetrating thin layer of paint, which would make it difficult to exchange the transducer.

According to this claim, the portion of the bumper and projection that encloses the membrane is funnel-shaped, which results in an advantageous radiation density. An advantageous further development of the invention may be achieved by connecting a portion of the holder to the bumper in one piece. Thus, not only are the mold seams associated with the installation of a holder into the bumper avoided, but the mold seams on the transducer itself are also partially covered and the design of the transducer is simplified at the same time. The comments made earlier regarding the specifications for the bumper casting mold also apply here, so that the design of the casting mold can be kept relatively simple in spite of the lack of multiple mold seams.

DETAILED DESCRIPTION OF THE PREFERRED EMBODIMENTS

Figure 1:
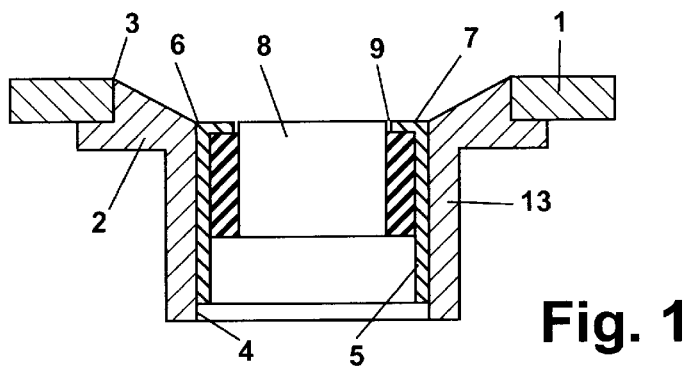
FIG. 1 depicts the structure of a bumper known in the art.

In the schematic drawing in FIG. 1, a holder 2 is inserted into the partially depicted bumper 1 and is welded or glued to the bumper 1. A first mold seam 3 results between the bumper 1 and the holder 2. The holder 2 features a clearance hole 4 into which the casing of an ultrasound transducer is inserted. The transducer casing is locked into the holder 2 by suitable means. Examples of locking methods are described in DE195 28 474.7 and will not be described again here. The significant element of the known design of the holder is that a second mold seam 6 is provided between the transducer casing 5 and the inner wall of the clearance opening 4 in addition to the first mold seam 3, as well as a third mold seam 9 between the radial wall 7 and the casing surface of the resonator 8. According to the invention, this type of design can be simplified in that, according to FIG. 4, a radial projection (console) 10 is featured on the holder 2 that acts as a panel and covers the leading edge of the transducer casing 5, as well as a portion of the seal 11, elastically suspending the resonator 8 from the inner wall of the transducer casing 5. As a result, a mold seam 6 is avoided and the casing 5 is more simply structured in that the projection 10 acts as a limit stop for the casing 5 and the seal 11, so that the radial wall 7 (FIG. 1) of the casing 5 can be eliminated. It should also be noted that the third mold seam 9 is not as narrow as it is in the known design depicted in FIG. 1, as it would otherwise easily become covered with pain and prevent removal of the transducer from the holder.

Figure 4:
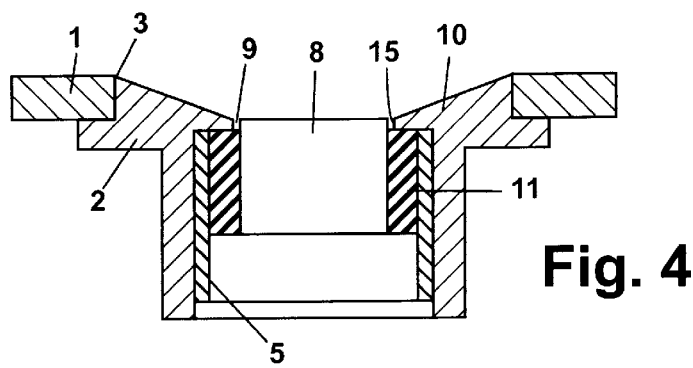
FIG. 4 depicts a holder with a projection covering the mold seams.

In summary, in the design according to the invention depicted in FIG. 4 the mold seam 6 is eliminated, clogging of the mold seam 9 during overpainting is avoided and, finally, the design of the transducer casing is simplified.

Figure 5:
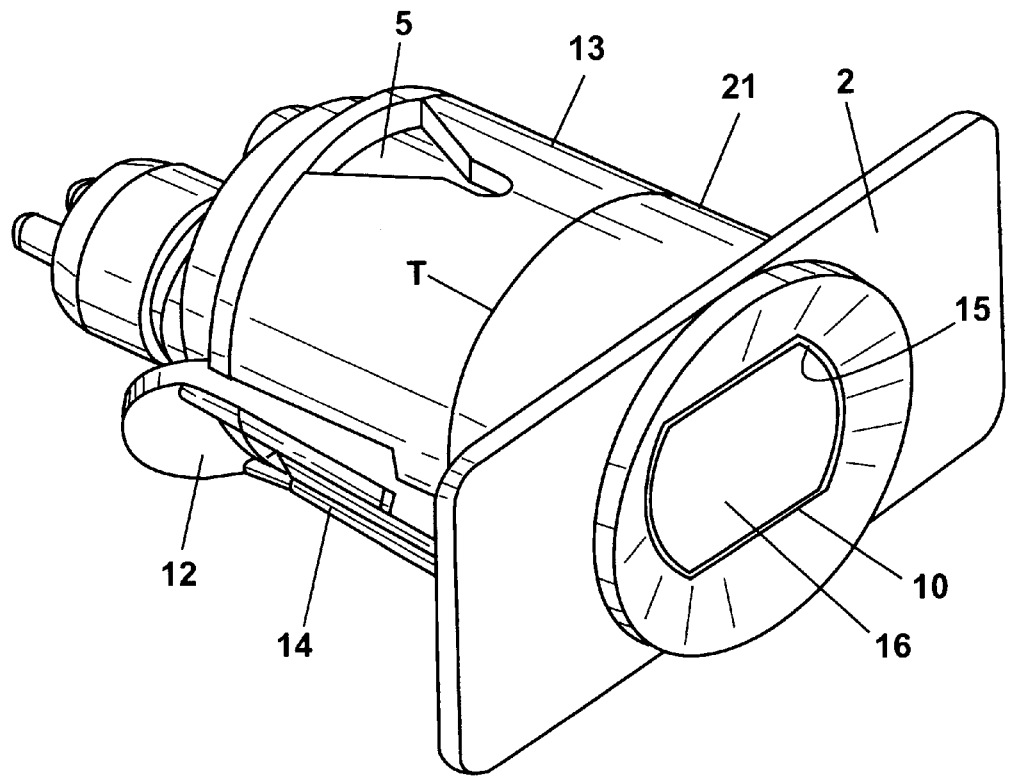
FIG. 5 depicts a larger-scale depiction of the transducer depicted schematically in FIG. 4.

FIG. 5, which provides an enlarged and spatial depiction of a possible execution of the holder according to FIG. 4, also depicts locking clips 12 that enable the transducer casing 5 to be locked into the casing surface 13 of the holder 2. As is evident in FIG. 5, the locking clips 12 are reinforced with injected shock absorbing legs 14 to securely prevent the transducer 5 from slipping out of the holder 2. As is evident in FIG. 5, the projection 10 encompasses a clearance surface 15 into which a partial surface 16 of the resonator projects. Although this can be circular, to generate a suitable beam in this particular case it is designed in such a way that the partial surface 16 consists of a circular surface from which two lateral circle segments have been removed.

Figure 3:
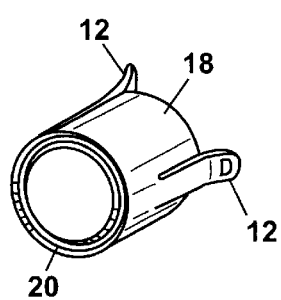
FIG. 3 depicts a smaller-scale image of the second holder segment shown in FIG. 2.
Figure 2:
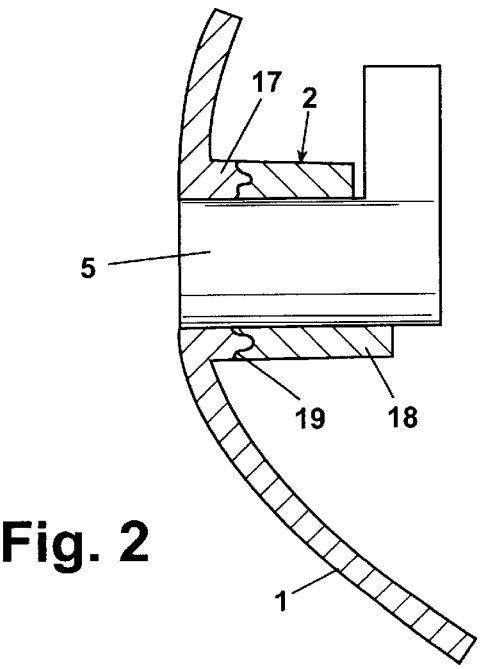
FIG. 2 depicts a highly simplified image of a bumper in which the holder is assembled from a first holder segment and a second holder segment.

FIG. 2 depicts a second means of avoiding another mold seam (additional). A holder consisting of two holder sections is connected to the bumper 1. In terms of the invention, it is important that the first holder segment 17 is integrally cast with the bumper 1 in one piece, thus eliminating the mold seam visible in FIGS. 1 and 2. The reason for constructing the holder 2 out of a first holder segment 17 and a second holder segment 18 consists in the fact the featured locking clips and possible bayonet joints make the design of the lower second holder segment 18 relatively complex, as is evident in FIG. 5, and that the objective is to avoid such complicated shaping in the bumper casting mold. This type of advance performance in the casting mold may not be economical, as not all vehicles feature transducers in their bumpers. Furthermore, the second holder segment 18 can assume a certain adapter function with respect to varying transducer casing 5 dimensions, in that the second holder segment is adapted to the outer surface of the transducer casing 5 and simultaneously possesses a matching interface with the first holder segment 17, so that these two parts, which may feature different transducers, can be joined together. The complex design of the second holder segment 18 of the holder component 2 is suggested in FIG. 3.

Another important feature of the invention is the use of a centering projection 19 on the first holder segment 17 that matches the centering recess 20 (see FIG. 3) of the second holder segment 18. Joining together the projection 19 and the recess 20 produces a larger connection surface while simultaneously centering the two holder segments against one another. The use of matching projections and recesses that are also interchangeable with respect to the first and second holder segment provides a certain key function, in that only matching holder parts can be joined together, thus preventing the installation of incorrect transducers.

The execution depicted in FIG. 2 can also be combined with the execution depicted in FIG. 4, thus eliminating two mold seams and combining the advantages offered by both designs. Consequently, the resulting bumper with an assembled holder and an inserted transducer is particularly well-suited for painting. A possible separating line is indicated by the letter T in FIG. 5.

What is claimed is:

1. A bumper assembly, comprising:
   a bumper body,
   a holder for acceptance of an ultrasound transducer wherein the holder is attached to the bumper body and has two segments and that the two holder segments are arranged in series in the longitudinal direction of the transducer where the first holder segment which faces the bumper is connected to the bumper in one piece, and that the second holder segment which faces away from the bumper is permanently connected to the bumper.

2. Bumper according to claim 1, wherein the first holder segment is an essentially hollow cylinder-shaped projection integrally cast to the bumper.

3. Bumper according to claim 1, wherein the corresponding edges of the two holder segments are welded, glued or locked together.

4. Bumper according to claim 2, wherein the projection features, on its edge facing away from the bumper a preferably circumferential projection or recess that matches a corresponding recess or projection on the corresponding edge of the second holder segment.

5. Bumper according to claim 2, wherein the projection adjoins the edge of a clearance opening, preferably integrally cast into the bumper, for acceptance of the transducer.

6. Bumper with a holder for acceptance of an ultrasound transducer with the holder featuring an opening for acceptance of the ultrasound transducer, comprising:
   a circumferential console which forms a limit stop for the transducer, which can be inserted into a clearance hole, is provided at the point at which the clearance hole ends on the bumper side.

7. Bumper according to claim 6, wherein the transducer exhibits an essentially hollow cylinder-shaped casing in which a resonator of the transducer is suspended by means of an annular seal and that the only portion of the resonator that protrudes into a clearance surface limited by the console is that which is provided for radiation of the ultrasound waves and rises above the face of the seal.

8. Bumper according to claim 6, wherein the face of a resonator essentially concludes with the front surface of the bumper.

9. Bumper according to claim 6, wherein the face of the holder slants in the shape of a funnel toward the interior, with the outer holder edge being positioned approximately in the plane of the front surface of the bumper and the inner holder edge being positioned approximately in the plane of the face of a resonator.

10. Bumper according to claim 6, wherein at least one section of the holder facing the bumper is integrated into the bumper and is preferably integrally cast with the bumper.

* * * * *